Patented Feb. 22, 1938

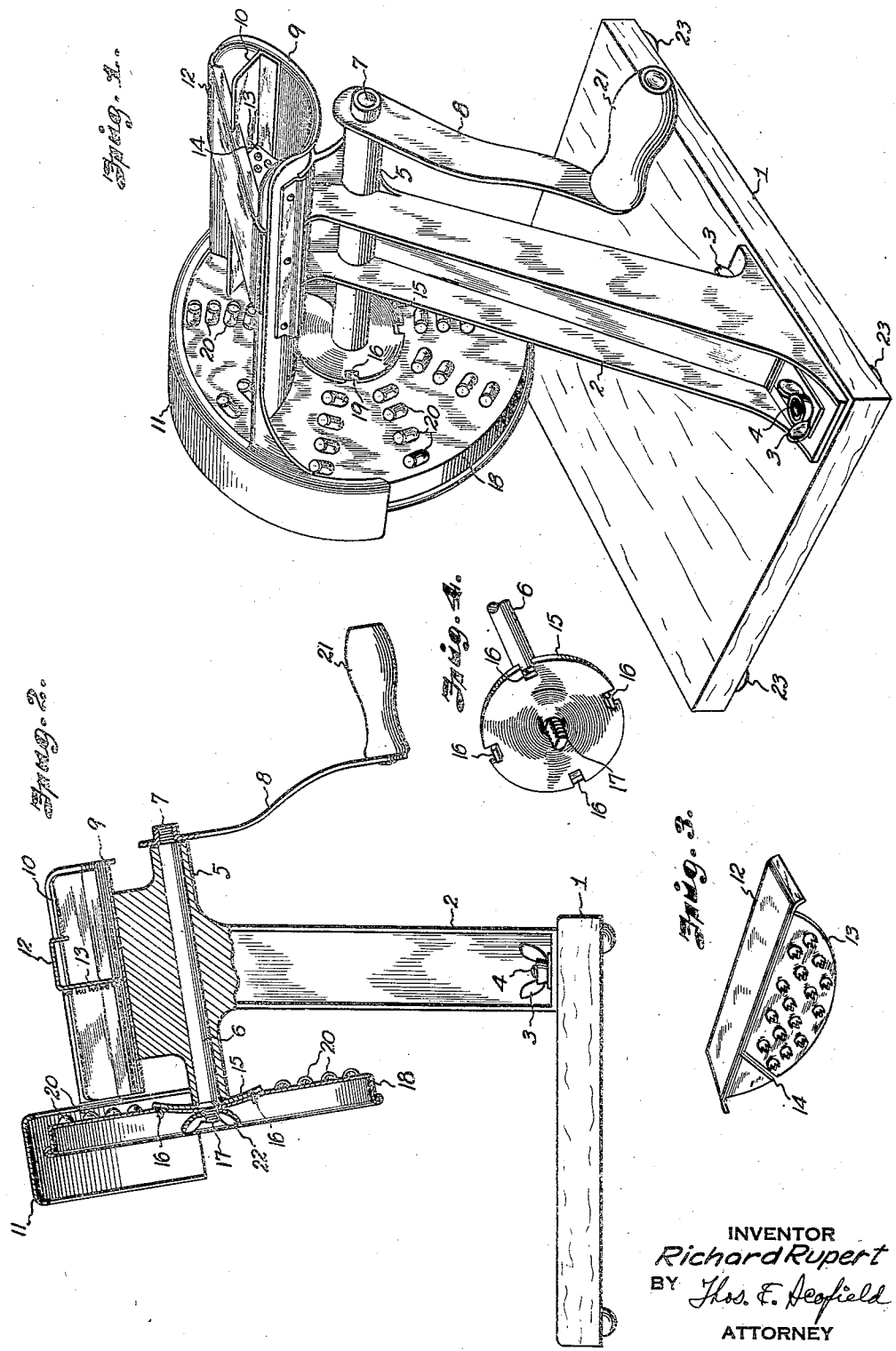

2,109,358

UNITED STATES PATENT OFFICE 2,109,358

VEGETABLE CUTTER OR GRATER

Richard Rupert, Kansas City, Mo., assignor to Foster L. Talge, Kansas City, Mo., operating as Rival Manufacturing Company Application August 26, 1935, Serial No. 37,832

3 Claims. (Cl. 146—116)

My invention relates to vegetable cutters or graters and more particularly to a device for cutting or grating vegetables in order to prepare them rapidly for cooking and/or table use.

One object of my invention is to provide a vegetable cutter or grater in which means are provided for feeding vegetables to the cutting knives.

Another object of my invention is to provide a device of the character described, which admits of easy sanitation.

Other and further objects of my invention will appear from the following description.

In the accompanying drawing which forms part of the instant specification and is to be read in conjunction therewith and in which like reference numerals are used to indicate like parts in the various views.

Figure 1 is a perspective view of the vegetable cutter of my invention.

Figure 2 is a side elevation of the vegetable cutter of my invention with parts in section.

Figure 3 is a perspective view of a portion of the feeding arrangement.

Figure 4 is a view of a detail showing the means of preventing relative movement between the cutting elements and the actuating shaft.

My invention contemplates the provision of a base 1 to which a pedestal 2 may be secured by means of a pair of butterfly nuts 3, adapted to be threaded upon a pair of stud screws 4, which are secured in the base 1. The pedestal 2 is formed with a journal 5 at its upper end in which a shaft 6 is adapted to rotate. One end of shaft 6 is provided with screw threads 7 upon which an operating lever 8 is adapted to be threaded. Secured to the upper end of the pedestal 2 is a trough member 9 which carries an inwardly extending flange 10 and an arcuate shield 11. Slidably positioned bridging the trough 9 is a feeding member 12 having a depending portion 13 adapted to conform with the trough 9. The depending portion 13 is provided with a slot 14, which is adapted to receive the flange 10. The other end of shaft 6 carries secured thereto or formed integral therewith, a disk 15 having portions of the periphery thereof bent to form lugs 16. The outer end of shaft 6 is screw threaded at 17 and is provided with two flattened lateral surfaces. The cutting element 18 is provided with a central opening conforming to the shape of the outer end of shaft 6 and with openings 19 for the reception of the lug 16. The face of the cutting element toward the trough 9 is provided with a series of cutters 20 formed integral therewith.

In operation the feeding member 12 is drawn rearwardly and the vegetable to be cut or grated is placed in the trough. The feeding element is then manually moved forward, permitting the depending portion 13 to engage the vegetable and bring it to bear against the face of the cutting element 18. The operating lever 8 is then rotated through the medium of the handle 21. A receptacle of any desired nature is placed upon the base member 1 to receive the cut vegetables. When it is desired to clean the device, the butterfly nut 22 which secures the cutting element to the shaft is removed. This permits the operating shaft 6 and the handle to be withdrawn, admitting of thorough and easy cleaning.

My device has many advantages. By using my feeding element, all danger of cutting the fingers or hand of the operator is avoided. The flat sides of the outer end of the shaft 6 insure that the cutting element is always replaced with the holes 19 in correct alignment with lug 16. A series of removable cutting elements may be provided having different shaped knives for cutting in various sizes, grating, and the like. The pedestal 1 may be provided with rubber cushions 23 to prevent the skidding and slipping of the base during operation.

Having thus described my invention, what I claim is:

1. In a device for cutting or grating vegetables, a standard, a shaft journaled in said standard, a cutting means secured to said shaft for rotation therewith, a trough supported on said standard with one end thereof in proximity to said cutting means, a guide flange positioned in said trough and extending longitudinally thereof, a feeding member supported on said trough and adapted to be moved therealong for pressing a vegetable into contact with said cutting means, said feeding member being formed with guide means adapted to engage said flange, said flange having its upper edge lying substantially in a plane with the edges of said trough.

2. In a device for cutting or grating vegetables, a standard, a shaft journaled in said standard, a cutting disk secured to said shaft for rotation therewith, a trough supported on said standard with one end thereof in proximity to said cutting means, a projecting guide means in said trough extending longitudinally thereof, a feeding member supported on said trough and provided with means engaging said guide means, said projecting guide means having its upper edge lying substantially in a plane with the edges of said trough and adapted to be moved therealong for pressing a vegetable into contact with said cutting disk, and means for rotating said shaft.

3. In a device for cutting or grating vegetables, a standard, a shaft journaled in said standard, a cutting disc secured to said shaft for rotation therewith, a trough supported on said standard with one end thereof in proximity with said cutting means, projecting guide means in said trough, feeding member comprising a transverse member and a depending member, said depending member adapted to conform with the shape of said trough, said transverse member supported by the lips of said trough, said feeding member being formed with means for engaging said trough guide means, said projecting guide means having its upper edge lying substantially in a plane with the lips of said trough.

RICHARD RUPERT.